United States Patent
Heinzel et al.

(10) Patent No.: US 8,202,629 B2
(45) Date of Patent: Jun. 19, 2012

(54) CLADDING TUBES MADE OF FERRITIC/MARTENSITIC OR AUSTENITIC STEEL FOR NUCLEAR FUEL ELEMENTS/FUELS AND METHOD FOR SUBSEQUENTLY TREATING A FECRA PROTECTIVE LAYER THEREON THAT IS SUITED FOR HIGH TEMPERATURES

(75) Inventors: Annette Heinzel, Linkenheim-Hochstetten (DE); Georg Mueller, Karlsruhe (DE); Alfons Weisenburger, Rastatt (DE); Frank Zimmermann, Eggenstein-Leopolfshafen (DE); Gustav Schumacher, Karlsruhe (DE); Vladimir Engelko, St. Petersburg (RU)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 952 days.

(21) Appl. No.: 11/994,286

(22) PCT Filed: Jun. 20, 2006

(86) PCT No.: PCT/EP2006/005877
§ 371 (c)(1), (2), (4) Date: Aug. 12, 2008

(87) PCT Pub. No.: WO2007/000261
PCT Pub. Date: Jan. 4, 2007

(65) Prior Publication Data
US 2009/0035604 A1    Feb. 5, 2009

(30) Foreign Application Priority Data
Jun. 29, 2005 (DE) .......................... 10 2005 030 231

(51) Int. Cl.
*B32B 15/01* (2006.01)
*B32B 15/18* (2006.01)

(52) U.S. Cl. ............. 428/684; 420/77; 420/79; 376/457

(58) Field of Classification Search ........................ None
See application file for complete search history.

(56) References Cited

U.S. PATENT DOCUMENTS

| | | | | |
|---|---|---|---|---|
| 3,345,197 | A * | 10/1967 | Martini et al. | 427/192 |
| 3,400,010 | A | 9/1968 | Keating | |
| 4,232,094 | A | 11/1980 | Rhodes et al. | |
| 4,362,696 | A * | 12/1982 | Brehm et al. | 376/417 |
| 5,635,654 | A * | 6/1997 | Hebsur et al. | 75/244 |
| 6,197,386 | B1 | 3/2001 | Beyer et al. | |
| 6,475,647 | B1 * | 11/2002 | Mendez Acevedo et al. | 428/678 |
| 6,627,007 | B2 * | 9/2003 | Andersson et al. | 148/320 |
| 2003/0194343 | A1 * | 10/2003 | Craig | 420/35 |

FOREIGN PATENT DOCUMENTS

| | | |
|---|---|---|
| DE | 1242300 | 6/1967 |
| DE | 247924 | 7/1987 |
| DE | 19609690 | 10/1997 |
| DE | 19853285 | 6/2000 |
| EP | 0190378 | 8/1986 |
| EP | 1010183 | 6/2000 |

* cited by examiner

*Primary Examiner* — Jennifer McNeil
*Assistant Examiner* — Adam Krupicka
(74) *Attorney, Agent, or Firm* — Leydig, Voit & Mayer, Ltd.

(57) ABSTRACT

A cladding tube configured for use with nuclear fuels or nuclear feel elements and configured for contact with molten lead or molten lead alloys at up to 800° C. The cladding tube includes a tube including at least one of ferritic/martenisitic steel and austenitic steel. An alloy layer of up to 50 μm thickness is disposed on a surface of the tube and operable for corrosion resistance. The alloy layer includes 0-25% chromium, 3-15% aluminum and 60-97% iron. A method of making the cladding tube includes the use of a pulsed electron beam to melt the alloy layer on the tube.

3 Claims, 2 Drawing Sheets

CLADDING TUBES MADE OF FERRITIC/MARTENSITIC OR AUSTENITIC STEEL FOR NUCLEAR FUEL ELEMENTS/FUELS AND METHOD FOR SUBSEQUENTLY TREATING A FECRA PROTECTIVE LAYER THEREON THAT IS SUITED FOR HIGH TEMPERATURES

CROSS REFERENCE TO RELATED APPLICATIONS

This is a U.S. National Phase application under 35 U.S.C. §371 of International Application No. PCT/EP2006/005877, filed on Jun. 20, 2006, and claims the benefit of German Patent Application No. 10 2005 030 231.9, filed on Jun. 29, 2005. The International Application was published in German on Jan. 4, 2007 as WO 2007/000261 A2 under PCT Article 221(2).

FIELD OF THE INVENTION

The invention relates to a cladding tube made of ferritic/martensitic or austenitic steel for nuclear fuel elements, which is exposed to a metallic coolant. The cladding tubes are for use in reactor arrangements having molten-metal cooling, the molten-metal coolant including lead or lead alloys.

BACKGROUND

Steel surfaces, such as those of the cladding tubes or internal structures in reactors that are operated with molten lead or lead alloys, are subject to corrosive attack by the molten metal. Gradual destruction of the metal components takes place by dissolution of alloy elements of the steel. This process can be prevented if oxygen is dissolved in the lead or its alloys, specifically at a concentration at which oxide layers form on the surface and suppress the dissolution process. The oxygen concentration, however, preferably does not exceed the value at which oxides of the lead alloys form.

In the presence of lead alloys that contain oxygen at a concentration at which the steel oxidizes but the lead alloys do not, the diffusion of iron ions at the surface produces magnetite layers, and the diffusion of oxygen into the metal produces spinel layers beneath the surface that continually grow over time. This process prevents dissolution attack by the lead alloys, but after an extended time results in a considerable degradation of material properties due to oxidation. In addition, a reliable protective effect is thereby achieved only for temperatures below 500° C. Because higher temperatures may be expected on cladding tubes in a reactor, additional protective layers must be considered for higher temperatures. The use of aluminum-containing alloys that, by the selective formation of thin aluminum oxide layers, represent an outstanding diffusion barrier again dissolution attack by the molten metal and against progressive oxidation of the steel, is very promising in this regard. It is not practical to add aluminum as an alloy to the entire steel matrix, since it is known that aluminum causes severe embrittlement of steel. The aluminum component must therefore be limited to a thin superficial layer. Two methods have been tested for the production of aluminum-containing surface alloys: industrial "pack cementation" and, on a laboratory scale, surface melt alloying using pulsed electron beams (GESA method). "Pack cementation" is a high-temperature diffusion method in which aluminum is diffused at approximately 900° C., in the gas phase, into the steel matrix. In the GESA method, a previously applied aluminum layer or thin film is alloyed into the steel surface with the aid of a pulsed electron beam. The basic protective mechanism has been confirmed on specimens treated with both methods. Transfer of the two methods for use on real thin-walled tubes has, however, been unsatisfactory. Because of the high process temperature for the diffusion method, utilization may be limited to nickel-containing austenitic steels. The dimensional stability of the cladding tubes cannot be guaranteed because of the high temperature. The surface alloy layer furthermore contains nickel. Of all the alloy constituents of steel, nickel has the highest solubility in lead, so that long-term durability in lead and lead alloys becomes questionable. On the other hand, the GESA method has the disadvantage that, because of the limited physical extent of the electron beam, the elongated cladding tube must be treated in overlapping fashion with multiple pulses. A portion of the previously applied aluminum layer can vaporize in the overlap areas, so that locally, insufficient aluminum is alloyed into the steel surface. It is desirable to prevent such local defects.

SUMMARY

An aspect of the present invention is to make available a cladding tube made of ferritic/martensitic or austenitic steel for nuclear fuel elements/fuels which are equipped with a protective layer on the surface in contact with coolant, and which still provide a reliable protective effect at temperatures higher than 500° C.

In an embodiment, the present invention provides a cladding tube configured for use with nuclear fuels or nuclear fuel elements and configured for contact with molten lead or molten lead alloys at up to 800° C. The cladding tube includes a tube including at least one of ferritic/martensitic steel and austenitic steel. An alloy layer of up to 50 μm thickness is disposed on a surface of the tube and operable for corrosion resistance. The alloy layer includes 0-25% chromium, 3-15% aluminum and 60-97% iron.

In an embodiment, the invention also provides a method of making the cladding tube that includes the use of a pulsed electron beam to melt the alloy layer on the tube.

BRIEF DESCRIPTION OF THE DRAWINGS

The invention will be described in the following with reference to exemplary embodiments and the drawings, in which.

DETAILED DESCRIPTION

In an embodiment of the present invention FeCrAl is alloyed into the surface of a cladding tube. In the presence of oxygen, this selectively forms thin aluminum oxide layers of up to 50 μm which impede anion and cation diffusion to such an extent that corrosion protection by a very slow-growing oxide layer is produced. In molten lead or lead alloys, the cladding tube is protected by a surface alloy layer against corrosive attack by these molten metals at up to 800° C. The alloy layer in the embodiment is made up of 3 to 15% aluminum and 0 to 25% chromium by weight, with the remainder iron. As compared with a coating method using a protective oxide layer, the surface alloy forming a protective layer has the advantage that defects or cracks in the oxide layer are "healed" by the subsequently diffusing oxide formers; and that the protective layers remain stable, and retain their protective properties, at substantially higher temperatures (800° C.).

Technical implementation of the surface alloy may be carried out by coating using a low-pressure plasma spray (LPPS) method, which is available on an industrial scale. The necessary thin layers can be, however, very rough and porous because of the relatively large spray droplets, and among other characteristics do not have good adhesion, since the substrate temperature must be kept low (<600° C.) in order to ensure dimensional stability of the cladding tubes and, in the case of ferritic/martensitic cladding tubes, to maintain the microstructure of the steel. For these reasons, the FeCrAl layers are undesirable for use in this form. The layer, together with the cladding tube steel layer close to the surface, can therefore be remelted with a pulsed electron beam of approx. 20 to 40 µs duration, an electron energy of 100 to 200 keV, and an energy density of 30 to 50 J/cm$^2$, depending on its thickness. A homogeneous mixing of the alloy elements, together with the thin contact-melted surface layer of the steel, occurs in this context at the transition from the layer to the steel surface. This ensures intimate metallic joining of the alloy layer.

The brief remelting of the FeCrAl layer additionally smoothes and densifies it. Because the FeCrAl layer is very similar to the steel matrix of the cladding tube in terms of its thermophysical properties such as melting point, density, thermal conductivity, and vapor pressure, the remelting can be carried out here without difficulty using overlapping electron-beam pulses.

Figure 1:
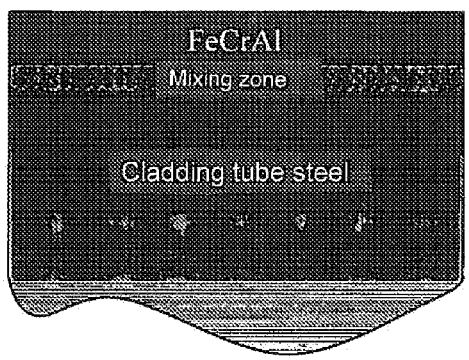
FIG. 1 schematically shows the structure of the alloy layer.

FIG. 1 is a schematic cross section of the structure of the protective alloy layer on the cladding-tube steel. It shows the melted FeCrAl layer on the steel surface which, in the contact melting zone of the steel surface (mixing zone), is joined in metallically fixed fashion to the steel matrix of the cladding tube, so as to provide a metallic fusion layer between the steel tube and the alloy layer.

Figure 2:
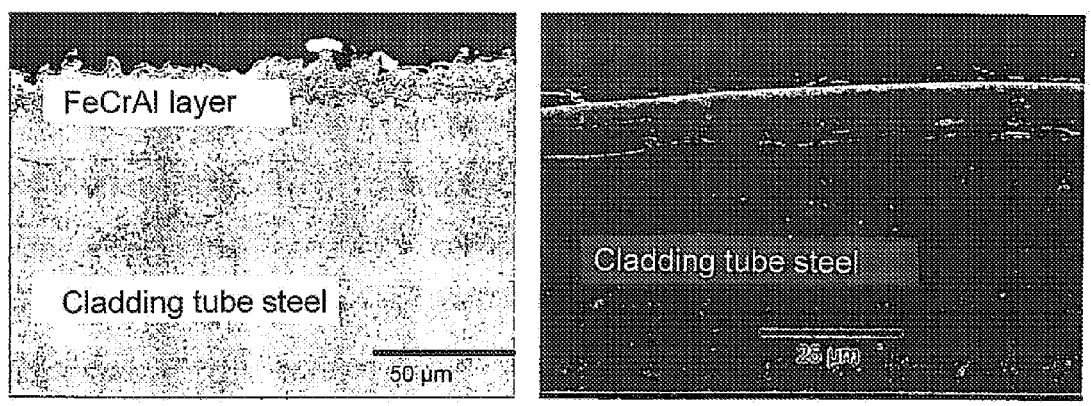
FIG. 2 shows the FeCrAl layer.

The melting depth can be extended to as much as 50 µm by way of the electron energy. The use of a pulsed electron beam has the advantage that the material zones of the cladding tube outside the alloy layer experience only slight heating. FIG. 2 shows cross sections through specimens after LPPS coating and subsequent treatment with the pulsed electron beam. The initially rough, porous FeCrAl layer, approximately 20 µm thick, becomes smooth and pore-free, and exhibits good metallic joining.

Figure 3:
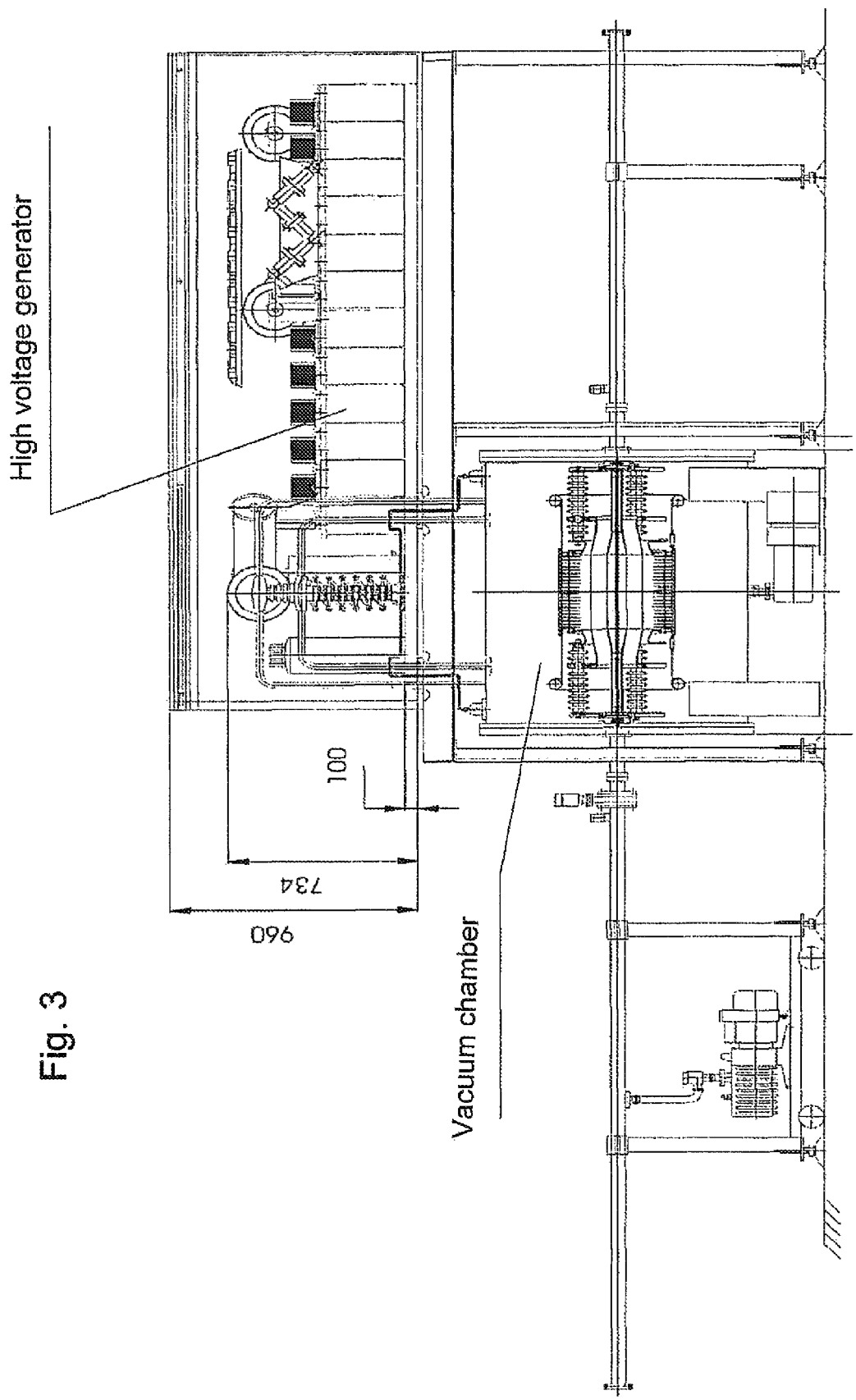
FIG. 3 is a cross section of the GESA unit.

The pulsed electron beam of the GESA IV unit (GESA=gepulste Elektronenstrahlanlage [pulsed electron beam system]), which was constructed for the treatment of cladding tubes (FIG. 3), is used to remelt and contact-melt the deposited layer. The unit comprises a high-voltage generator and a cylindrical electron accelerator that is located in a vacuum chamber. The electron beam has a lateral extension of 32 cm. This is the length that can be treated with one pulse. For long cladding tubes, the cladding tube is displaced along the axis of symmetry of the accelerator.

The invention has been described with regard to exemplary embodiments. However, changes and modifications/alterations can be made without hereby leaving the range of protection of the following claims.

The invention claimed is:

1. A cladding tube for nuclear fuels or nuclear fuel elements and configured for contact with molten lead or molten lead alloys at up to 800° C., the cladding tube comprising:
    a tube comprising at least one of ferritic/martensitic steel and austenitic steel; and
    an alloy layer of up to 50 µm thickness deposited on a' surface of the tube and melted into the surface using a pulsed electron beam, the alloy layer being operable for corrosion resistance, the alloy layer consisting of; by weight:

| | |
|---|---|
| chromium | 0-25%; |
| aluminum | 3-15%; and |
| iron | 60-97%. |

2. The cladding tube as recited in claim 1 further comprising a metallic fusion layer between the steel tube and the alloy layer.

3. The cladding tube as recited in claim 1, further comprising at least one of nuclear fuel and nuclear fuel elements disposed within the tube.

* * * * *